United States Patent
Keshet

(10) Patent No.: US 7,720,303 B2
(45) Date of Patent: May 18, 2010

(54) POLYNOMIAL APPROXIMATION BASED IMAGE FILTER METHODS, SYSTEMS, AND MACHINE-READABLE MEDIA

(75) Inventor: Renato Keshet, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1785 days.

(21) Appl. No.: 10/833,435

(22) Filed: Apr. 28, 2004

(65) Prior Publication Data

US 2005/0244073 A1 Nov. 3, 2005

(51) Int. Cl.
*G06K 9/40* (2006.01)
(52) U.S. Cl. ............... 382/260; 382/232; 351/246
(58) Field of Classification Search ........... 382/232, 382/260, 261, 300; 348/272; 351/246; 358/1.9, 358/3.26; 708/446
See application file for complete search history.

(56) References Cited

U.S. PATENT DOCUMENTS

| | | | | |
|---|---|---|---|---|
| 5,771,318 | A | | 6/1998 | Fang et al. |
| 5,774,601 | A | * | 6/1998 | Mahmoodi ............ 382/298 |
| 6,498,863 | B1 | * | 12/2002 | Gaidoukevitch et al. .... 382/173 |
| 6,665,448 | B1 | | 12/2003 | Maurer |
| 6,721,062 | B1 | * | 4/2004 | Sawada et al. ............ 358/1.9 |
| 6,731,821 | B1 | * | 5/2004 | Maurer et al. ............ 382/263 |
| 6,940,619 | B1 | * | 9/2005 | Easwar .................. 358/3.01 |
| 7,106,478 | B2 | * | 9/2006 | Takano .................. 358/3.26 |
| 7,315,653 | B2 | * | 1/2008 | Kondo .................. 382/236 |
| 7,315,654 | B2 | * | 1/2008 | Kondo .................. 382/238 |
| 7,373,020 | B2 | * | 5/2008 | Tsukioka ................ 382/300 |
| 2002/0021365 | A1 | * | 2/2002 | Yang et al. .............. 348/445 |
| 2002/0159650 | A1 | | 10/2002 | Hiroshige et al. |
| 2002/0159651 | A1 | * | 10/2002 | Tener et al. ............ 382/266 |
| 2002/0172431 | A1 | * | 11/2002 | Atkins et al. ........... 382/260 |
| 2002/0186309 | A1 | | 12/2002 | Keshet et al. |
| 2003/0026494 | A1 | * | 2/2003 | Woodell et al. ......... 382/260 |
| 2003/0026495 | A1 | | 2/2003 | Gondek et al. |
| 2003/0163498 | A1 | * | 8/2003 | Schmidt et al. ......... 708/446 |
| 2004/0208390 | A1 | * | 10/2004 | Jiang et al. ............ 382/260 |
| 2006/0215114 | A1 | * | 9/2006 | Flachenecker .......... 351/246 |

FOREIGN PATENT DOCUMENTS

WO WO 02/28087 4/2002

OTHER PUBLICATIONS

Michael Elad, "On the origin of the bilateral filter and ways to improve it," IEE Transactions on Image Processing, vol. II, No. 10, pp. 1141-1151 (Oct. 2002).
C. Tomasi et al., "Bilateral filtering for gray and color images," Proceedings of the 1998 IEEE International Conference on Computer Vision, Bombay, India (1998).
Pierre Kornprobst et al., "Nonlinear Operators in Image Restoration," Proceedings of the International Conference on Computer Vision and Pattern Recognition (1997).

* cited by examiner

*Primary Examiner*—Daniel G Mariam
*Assistant Examiner*—Aklilu K Woldemariam

(57) ABSTRACT

Polynomial approximation based image filter methods, systems, and machine-readable media are described. In one aspect, multiple n-order polynomial approximations to a value of a target pixel of an input image are computed from multiple respective sets of m values of pixels in a neighborhood of the target pixel, wherein $n \geq 0$ and $m \geq n+1$. A respective approximation error is computed from each of the computed n-order polynomial approximations. A value of a pixel of an output image is computed from the target pixel value and the computed approximation errors.

54 Claims, 4 Drawing Sheets

| n | $\beta_1$ | $\beta_2$ | $\beta_3$ | $\beta_4$ | $\beta_5$ | $\beta_6$ | $\beta_7$ | $\beta_8$ | $\beta_9$ | $\beta_{10}$ | $\beta_{11}$ |
|---|---|---|---|---|---|---|---|---|---|---|---|
| 0 | 1.0000 | | | | | | | | | | |
| 1 | 0.5000 | 0.5000 | | | | | | | | | |
| 2 | 0.3333 | 1.0000 | -0.3333 | | | | | | | | |
| 3 | -0.1667 | 0.6667 | 0.6667 | -0.1667 | | | | | | | |
| 4 | -0.1000 | 0.5000 | 1.0000 | -0.5000 | 0.1000 | | | | | | |
| 5 | 0.0500 | -0.3000 | 0.7500 | 0.7500 | -0.3000 | 0.0500 | | | | | |
| 6 | 0.0286 | -0.2000 | 0.6000 | 1.0000 | -0.6000 | 0.2000 | -0.0286 | | | | |
| 7 | -0.0143 | 0.1143 | -0.4000 | 0.8000 | 0.8000 | -0.4000 | 0.1143 | -0.0143 | | | |
| 8 | -0.0079 | 0.0714 | -0.2857 | 0.6667 | 1.0000 | -0.6667 | 0.2857 | -0.0714 | 0.0079 | | |
| 9 | 0.0040 | -0.0397 | 0.1786 | -0.4762 | 0.8333 | 0.8333 | -0.4762 | 0.1786 | -0.0397 | 0.0040 | |
| 10 | 0.0022 | -0.0238 | 0.1190 | -0.3571 | 0.7143 | 1.0000 | -0.7143 | 0.3571 | -0.1190 | 0.0238 | -0.0022 |

FIG. 5

POLYNOMIAL APPROXIMATION BASED IMAGE FILTER METHODS, SYSTEMS, AND MACHINE-READABLE MEDIA

BACKGROUND

Common image filtering techniques include image smoothing and image sharpening. Smoothing is a technique for reducing certain types of noise in an image. Sharpening is a technique for sharpening the edges within an image to improve the visual quality of the image. Non-selective filters treat all features in an image in the same way. Thus, flat regions of an image are treated in the same way as edge regions. Non-selective filters tend to smooth edge regions and/or to amplify noise. Selective filters (e.g., selective smoothing and/or selective sharpening filters), on the other hand, overcome the disadvantages of non-selective filters by applying the filtering function only to selected types features while preserving non-selected types features.

Some selective denoising techniques selectively smooth flat regions of an image, while leaving edge regions unsmoothed. Similarly, some selective sharpening methods selectively sharpen edge regions without sharpening flat regions. Some other denoising techniques, however, combine selective image sharpening and selective image smoothing in a single filter. For example, in one approach, a pre-existing selective smoothing filter is used to derive a matching nonselective smoothing filter by disabling the selectivity mechanism of the selective smoothing filter. The difference of the pre-existing and derived filters is substituted into the highpass filter operation of an unsharp masking filter operation to form the image processing filter.

One example of an edge preserving, selective smoothing filter is an anisotropic diffusion filter. Another example of a selective filter is a bilateral filter. One exemplary non-iterative, locally adaptive bilateral filter for removing noise from images corresponds to a weighted average of the local neighborhood pixels, where the weights are computed based on spatial distances between a center pixel and pixels neighboring the center pixel. Another type of selective filter is a robust filter that includes an influence function that is designed to reduce the influence of outliers (i.e., neighboring pixels with intensities that are very different from the intensity of the pixel being filtered).

In general, image filters are built based on models for approximating the local behavior of images. Low-resolution (e.g., less than 1 Mpixel) scans and images that are acquired by low-resolution cameras may be approximated by piecewise constant images, which consist of patches of constant colors separated by abrupt edges. Intermediate-resolution (e.g., up to about 2 Mpixels) scans and pictures are better approximated by piece-wise linear images, which consist of patches of constant gradients. Local regions of images of higher resolution (e.g., greater than 2 Mpixels), however, tend not to be represented accurately by piece-wise linear or piecewise constant approximations.

SUMMARY

In one aspect, the invention features an image filter method in accordance with which multiple n-order polynomial approximations to a value of a target pixel of an input image are computed from multiple respective sets of m values of pixels in a neighborhood of the target pixel, wherein $n \geq 0$ and $m \geq n+1$. A respective approximation error is computed from each of the computed n-order polynomial approximations. A value of a pixel of an output image is computed from the target pixel value and the computed approximation errors.

In another aspect, the invention features an image filter method in accordance with which a neighborhood of a target pixel is defined. A polynomial of order n is defined. An m-dimensional vector $\vec{1}$ with integer components $1_u$, wherein $u=1, \ldots, m$, and $m \geq n+1$, also is defined. An $m \times (n+1)$ matrix L with entries $L(u,v)=(l_u)^{n+1-v}$, $u=1, \ldots, m$, $v=1, \ldots, n+1$, is created. An m-dimensional vector $\vec{\beta}^T$ with values $\beta_u$ equal to row (n+1) of $(L^T L)^{-1} L^T$, wherein $L^T$ is a transpose of L, is computed.

The invention also features image filter systems and machine-readable media implementing these image filter methods.

Other features and advantages of the invention will become apparent from the following description, including the drawings and the claims.

DESCRIPTION OF DRAWINGS

FIG. 5 shows a table containing the components of a vector $\vec{\beta}$ of all orders zero through ten that are used to compute polynomial approximations to target pixels for an exemplary implementation of the image filter of FIG. 1.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

The image filter embodiments described in detail below enable robust polynomial filters to be designed that may be used to filter any image, including high-resolution images (e.g., greater than 2 Mpixels) that are better approximated by piece-wise polynomial images rather than by piece-wise constant or piece-wise linear images.

Figure 1:
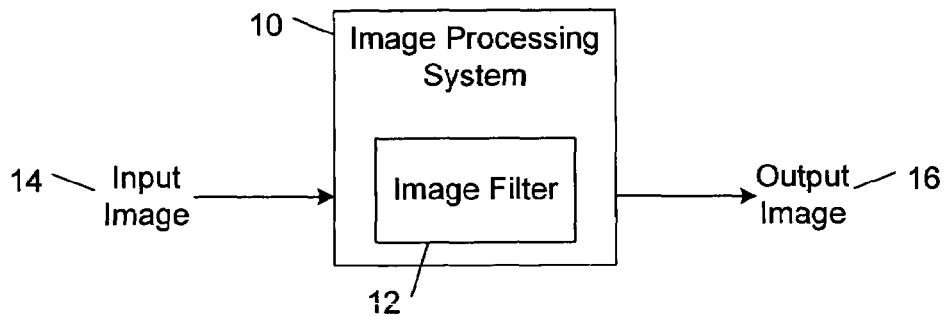
FIG. 1 is a block diagram of an embodiment of an image processing system that includes an embodiment of an image filter.

FIG. 1 shows an embodiment of an image processing system 10 that includes an embodiment of an image filter 12. The image processing system 10 receives an input image 14 and applies the image filter 12 to the input image 10 in the process of producing an output image 16. The input image 14 may correspond to an original image that was captured by an image sensor (e.g., a video camera, a still image, or an optical scanner) or a processed (e.g., compressed, reformatted, enhanced or otherwise modified) version of such an original image.

In general, the image processing system 10 and the image filter 12 are not limited to any particular hardware or software configuration, but rather they may be implemented in any computing or processing environment, including in digital electronic circuitry or in computer hardware, firmware, device driver, or software. For example, in some implementations, image processing system 10 may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

In general, the image filter 12 is a robust polynomial filter that utilizes a polynomial approximation of order at least 1 in the framework of a selective filter design. As explained in detail below, the image filter 12 is generated by fitting an n-order polynomial to a set of m collinear neighbors of a target pixel, where $n \geq 0$ and $m \geq n+1$. The value of the polynomial at the target pixel is the n-order approximation to the target pixel computed from the set of m neighbors. Each of the n-order approximations is used to compute a respective approximation error. The approximation errors are used as inputs to a robust influence function, which generates an influence function output value for each approximation error input. The average of the influence function output values are added to the target pixel value to generate the value of the corresponding pixel of the output image 16.

Figure 2:
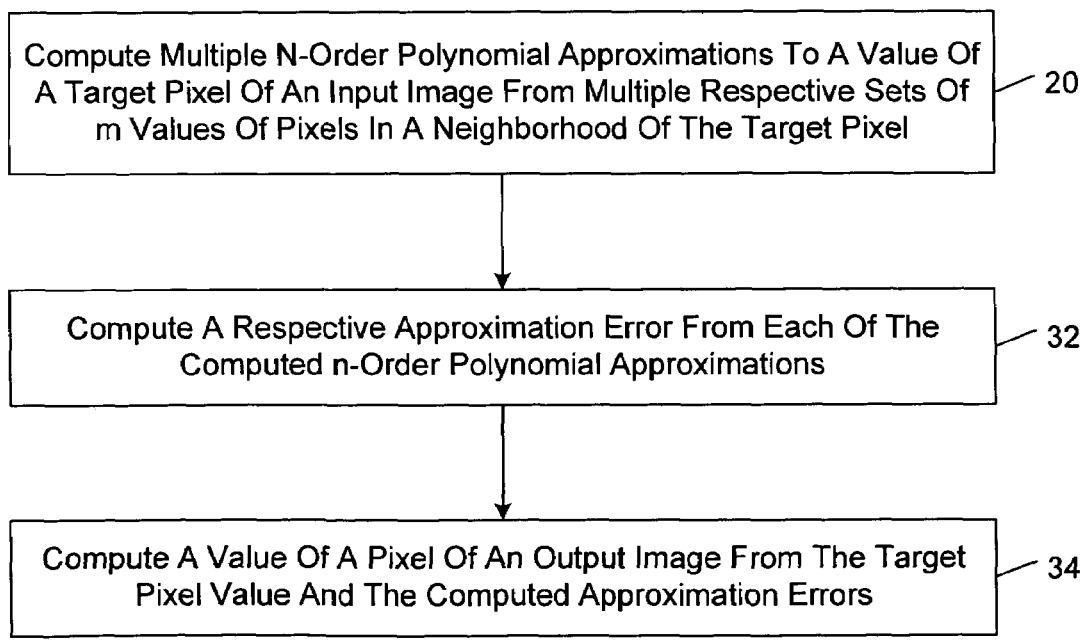
FIG. 2 is a flow diagram of an embodiment of an image filter method.

FIG. 2 shows an embodiment of a method that is implemented by image filter 12 to generate output image 16 from input image 14. In this method, multiple n-order polynomial approximations to a value of a target pixel of input image 14 are computed from multiple respective sets of m values of pixels in a neighborhood of the target pixel, wherein $n \geq 0$ and $m \geq n+1$ (block 20).

Figure 3:
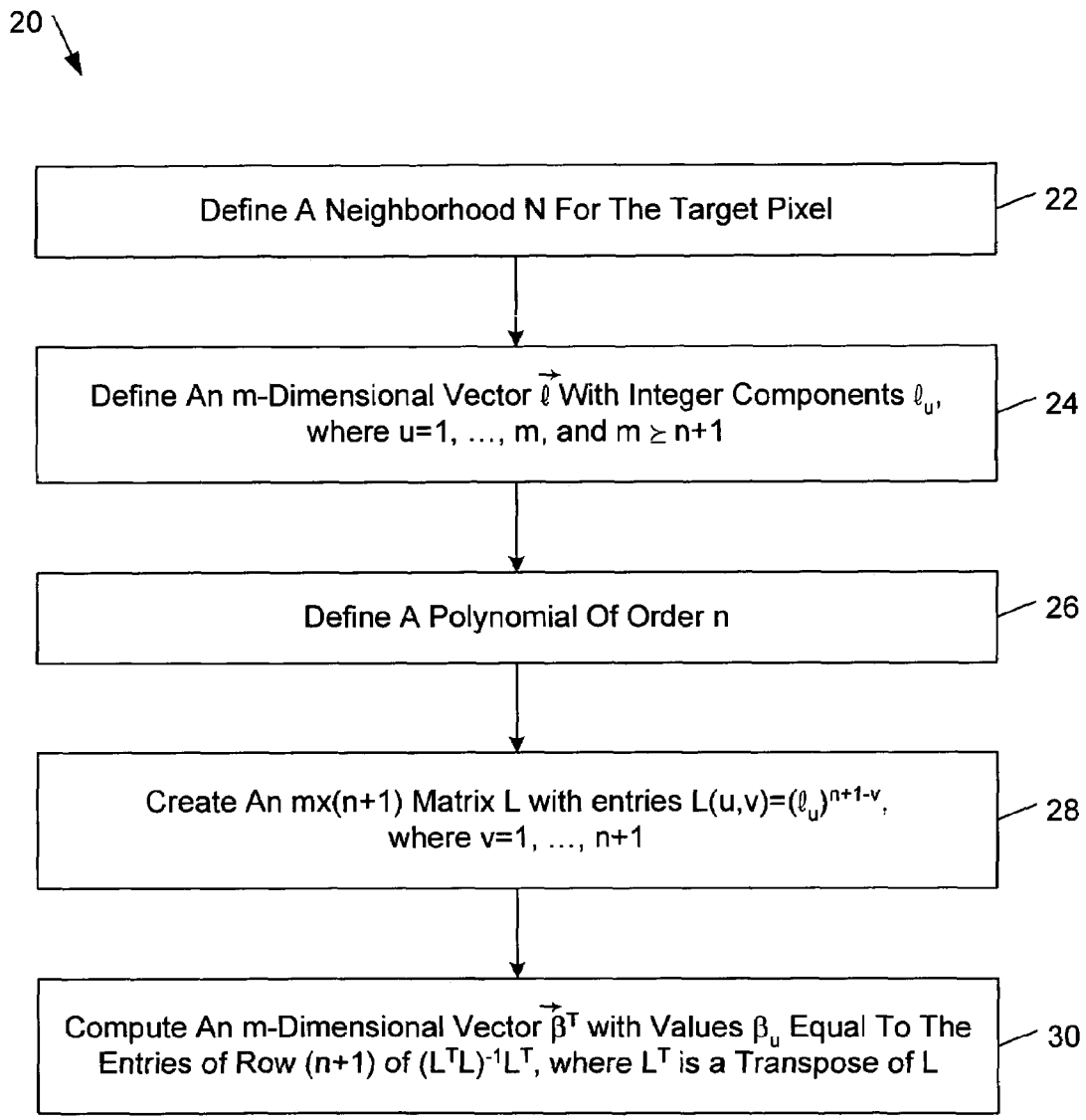
FIG. 3 is a flow diagram of an embodiment of a method of computing polynomial approximations to a target pixel value in accordance with the image filter method shown in FIG. 2.

Referring to FIG. 3, the polynomial approximations are computed as a function of m collinear neighbors of f(i+a,j+b) that lie in a neighborhood N of the target pixel f(i,j) that is defined for the values of a, b by the image filter 12 (block 22; FIG. 3). The target pixel f(i,j) is located at the origin of N (i.e., (0,0)). In some implementations, the target pixel f(i,j) is included in the set of m neighbor pixels unless m=n+1, in which case the target image pixel f(i,j) is not included in the set of m neighbor pixels because the polynomial approximation otherwise would be identical to f(i,j). In other implementations, the target pixel f(i,j) is not included in the set of m neighbor pixels whether or not m=n+1. In implementations where N excludes the target pixel, the neighborhood N may correspond to either a "punctured cross" {(0, 1), (0, −1), (1, 0), (−1, 0)}, or a "punctured square" {(0, 1), (0, −1), (1, 0), (−1, 0), (−1, −1), (−1, 1), (1, −1), (1, 1)}. The prefix "punctured" refers to the fact that these neighborhoods do not contain the origin (0, 0). Other punctured neighbors also are possible.

There are many different ways of selecting m collinear neighbors in association to a point (i+a,j+b). In the illustrated embodiments, the line formed by the m neighbors (or samples) passes through the target pixel location (i,j). In some implementations, a vector $\vec{1} = (l_1, \ldots, l_m)$ is defined that represents the positions of the m samples with respect to the target pixel location (i,j) on the line defined by the vector (a,b) (block 24; FIG. 3). In these implementations, the m samples are characterized by $\{f(i+l_u a, j+l_u b)\}$, where $u=1, \ldots, m$.

Figure 4A:
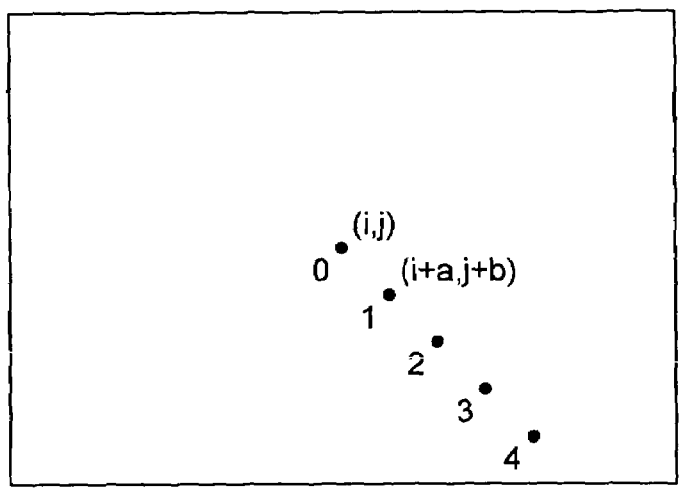
FIGS. 4A-4C are diagrammatic views of an input image region showing three different sets of pixels in a neighborhood of a target pixel in accordance with three different implementations of the image filter method shown in FIG. 2.
Figure 4B:
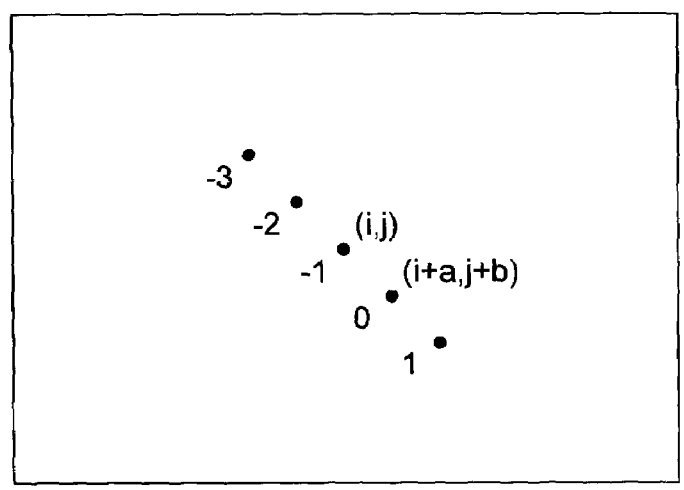
Figure 4C:
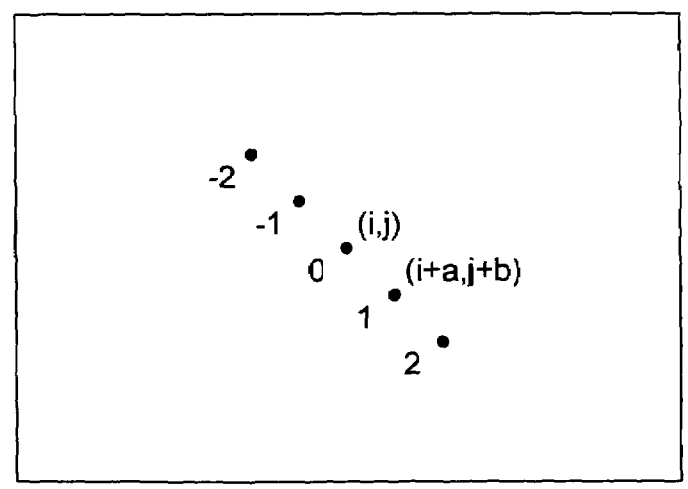

FIGS. 4A-4C show three different strategies for selecting the vector $\vec{1}$. Each of these strategies excludes the target pixel sample f(i,j) (i.e., for all u, $l_u \neq 0$). FIG. 4A shows an example of outward sampling, where the m points are selected away from the central target pixel location (i,j). That is, in the outward sampling strategy, the vector $\vec{1}$ is given by $l_u = u$, for $u=1, \ldots, m$. FIG. 4B shows an example of inward sampling, where the m points are selected towards the central target pixel location (i,j). In the inward sampling strategy, the vector $\vec{1}$ is given by: $l_1 = 1$ and $l_u = -(u-1)$, for $u=2, \ldots, m$. FIG. 4C shows an example of quasi-symmetric sampling, where the samples are selected to lie as symmetrically as possible with respect to (i+a,j+b). Because (i,j) is not included in the samples, a perfectly symmetrical configuration is not possible. The quasi-symmetric samples are characterized by $$\vec{1} = \{-\lfloor m/2 \rfloor, \ldots, -1, 1, \ldots, \lceil m/2 \rceil\}.$$

After the vector $\vec{1}$ has been defined (block 24; FIG. 3), a polynomial of order n is defined (block 26; FIG. 3). In one implementation, the n-order polynomial that is fitted to the points $\{f(i+l_u a, j+l_u b)\}$ is denoted by $p^n_{a,b}\{i,j\}(x)$, where $$p^n_{a,b}\{i,j\}(x) = \alpha_1 x^n + \alpha_2 x^{n-1} + \ldots + \alpha_{n+1} \tag{1}$$

where n>0. The optimal polynomial fitting of the samples in the mean square error (MSE) sense is the solution to the following minimization problem:

$$\|L\vec{\alpha} - \vec{f}\|^2 \xrightarrow{\vec{\alpha}} \min \tag{2}$$

where $$\vec{\alpha} \triangleq (\alpha_1, \ldots, \alpha_m), \vec{f} \triangleq [f(i+l_u a, j+l_u b)],$$

for $u=1, \ldots, m$, and the matrix $L_{m \times (n+1)}$ is given by:

$$L(u,v) = (l_u)^{n+1-v} \tag{3}$$

for $u=1, \ldots m$, $v=1, \ldots, n+1$.

The solution to the minimization problem in equation (2) is given by:

$$\vec{\alpha} = (L^T L)^{-1} L^T \vec{f} \tag{4}$$

where $L^T$ is the transpose of L. The n-order polynomial approximation to the target pixel f(i,j) is $p^n_{a,b}\{i,j\}(0)$, which is given by an $\alpha_{n+1}$, (i.e., the (n+1) component of $\vec{\alpha}$). Accordingly, $p^n_{a,b}\{i,j\}(0)$ is given by:

$$p^n_{a,b}\{i,j\}(0) = \alpha_{n+1} = \vec{\beta}^T \cdot \vec{f} \tag{5}$$

where $\vec{\beta}^T$ is by definition the $(n+1)^{th}$ row of $(L^T L)^{-1} L^T$.

Thus, to complete the computation of the n-order approximation to the target pixel f(i,j), the image filter 12 creates the $m \times (n+1)$ matrix L with the entries L(u,v) given by equation (3) (block 28; FIG. 3). Then the image filter 12 computes the m-dimensional vector $\vec{\beta}^T$ with values $\beta_u$ equal to the entries of the $(n+1)^{th}$ row of $$(L^T L)^{-1} L^T$$

(block 30; FIG. 3).

Referring back to FIG. 2, image filter 12 computes a respective approximation error from each of the computed n-order polynomial approximations (block 32; FIG. 2). In this regard, each approximation error $E_{a,b}$ is computed by subtracting the target pixel value from a respective approximation error as follows:

$$E_{a,b} = p^n_{a,b}\{i,j\}(0) - f(i,j) \tag{6}$$

In accordance with the embodiment shown in FIG. 3, equation (6) can be rewritten as follows:

$$E_{a,b} = \left(\sum_{u=1}^{m} \beta_u f(i + l_u a, j + l_u b)\right) - f(i, j) \tag{7}$$

Image filter 12 computes a value of a pixel of output image 16 from the target pixel value and the computed approximation errors (block 34; FIG. 2). In some implementations, image filter 12 computes the output image pixel value g(i,j) by inputting the approximation errors $E_{a,b}$ into a robust influence function ψ, averaging the influence function values, and adding the result to the target pixel value f(i,j) in accordance with equation (8):

$$g(i, j) = f(i, j) + \frac{1}{|N|+1} \sum_{(a,b) \in N} \psi[E_{a,b} - f(i, j)] \tag{8}$$

In accordance with the embodiment shown in FIG. 3, equation (8) can be rewritten as follows:

$$g(i, j) = f(i, j) + \frac{1}{|N|+1} \sum_{(a,b) \in N} \psi\left[\left(\sum_{u=1}^{m} \beta_u f(i + l_u a, j + l_u b)\right) - f(i, j)\right] \tag{9}$$

The robust influence function ψ may be any type of robust influence function. The robust influence function ψ is a function that modifies an input approximation error, influencing it differently depending on the intensity of the approximation error. Small approximation errors are considered to be due to "noise" that should be removed, whereas large approximation errors are considered to be due to features (such as object edges) that should be preserved or enhanced. In equation (9), we see that the influence function influences terms of an averaging procedure. In the illustrated embodiments, if the influence function does not modify the values of the input approximation errors, then these inputs will be averaged—so this should be what happens to noisy regions, because averaging reduces noise. On the other hand, if the influence function reduces the intensity of the input approximation errors, then the output will be close to the input, which should be the case on important features to be preserved. Therefore, in the illustrated embodiments, the influence function is close to identity for small differences, whereas it approximately zeroes out large differences. In some implementations, the influence function has a positive derivative for the low amplitude inputs and a slope close to zero, or negative, for high amplitude inputs. In some implementations of image filter 12, the influence function ψ is configured to perform at least one of the following objective functions: remove noise from input image 14 without blurring edges; and sharpen input image 14 without increasing noise.

In some exemplary implementations of image filter 12, there are two separate stages in the filtering process:

1) The computation of the values of $\vec{\beta}^T$, and

2) The use of the values of $\vec{\beta}^T$ in the process of filtering the input image.

In some of these implementations, stage 1 is performed only once, off-line. The values of $\vec{\beta}^T$ are pre-computed, for example, in factory, or in a lab, and the values of $\vec{\beta}^T$ are stored in a table or in any other form of non-erasable memory inside the image processing system 10, in a hardware implementation, or stored in a file that is accessible by an image filtering program, in a software implementation. Once the values of $\vec{\beta}^T$ are computed for a particular implementation (i.e., for a particular vector $\vec{1}$, and particular values of m and n), there is no need to recompute these values if they are properly stored. In these implementations, stage 2 is performed on-line for each input image the image processing system 10. During stage 2, the values of $\vec{\beta}^T$ are retrieved from the storage and used to calculate the approximation errors for each target pixel. In some implementations, the values of $\vec{\beta}^T$ are hard-coded in, for example, hardware, firmware, or software, so that the process of retrieving these values is not needed.

In other implementations, the values of $\vec{\beta}^T$ are not pre-stored, and instead these values are computed on-line, on-the-fly. In some of these implementations, a different set of values for $\vec{\beta}^T$ is calculated for each pixel in the image, according to one or more image-dependent criteria.

EXAMPLE 1

One exemplary first-order robust polynomial filter obtained from equation (9) corresponds to the case where n=1, $\vec{1} = (-1, 1)$, and N corresponds to the punctured square $\{(0, 1), (0, -1), (1, 0), (-1, 0), (-1, -1), (-1, 1), (1, -1), (1, 1)\}$. In this example, $$L = \begin{pmatrix} -1 & 1 \\ 1 & 1 \end{pmatrix} \tag{10}$$

$$(L^T L)^{-1} L^T = \begin{pmatrix} 1/2 & -1/2 \\ 1/2 & 1/2 \end{pmatrix} \tag{11}$$

and therefore β=(½,½). Accordingly, the corresponding first-order robust filter is given by:

$$g(i, j) = f(i, j) + \frac{1}{9} \sum_{(a,b) \in N} \psi\left[\frac{1}{2}[f(i+a, j+b) + f(i-a, j-b)] - f(i, j)\right] \tag{12}$$

In this example, $p_{a,b}(0) = p_{-a,-b}(0)$ for all (a,b). Therefore, computational resources may be conserved by joining symmetrical points. This simplification is always possible when $\vec{1}$ is symmetrical around (0,0). The first-order filter defined in equation (12) may be expanded by writing the neighborhood terms is explicitly as follows:

$$g(i, j) = f(i, j) + \frac{2}{9}\{\psi\{[f(i+1, j+1) + f(i-1, j-1)]/2 - f(i, j)\} + \quad (13)$$

$$\psi\{[f(i+1, j-1) + f(i-1, j+1)]/2 - f(i, j)\} +$$

$$\psi\{[f(i+1, j) + f(i-1, j)]/2 - f(i, j)\} +$$

$$\psi\{[f(i, j-1) + f(i, j+1)]/2 - f(i, j)\}\}$$

The first-order robust filter of equations (12) and (13) reduces image posterization and reduces contouring in slowly varying regions. Different first-order robust filters may be generated from equation (9).

EXAMPLE 2

Some exemplary robust polynomial filters that may be obtained from equation (9) may be generated for the particular case where a quasi-symmetric sampling is considered and m=n+1. The table shown in FIG. 5 provides the components of $\vec{\beta}$ of all orders zero through ten for this particular case.

By using the table shown in FIG. 5, the following exemplary second-order robust filter may be obtained:

$$g(i, j) = f(i, j) + \frac{1}{9}\sum_{(a,b)\in N}\psi\left[\frac{1}{3}f(i-a, j-b) + \quad (14)\right.$$

$$\left. f(i+a, j+b) - \frac{1}{3}f(i+2a, j+2b) - f(i, j)\right]$$

Other embodiments are within the scope of the claims.

The systems and methods described herein are not limited to any particular hardware or software configuration, but rather they may be implemented in any machine, computing or processing environment, including in digital electronic circuitry or in computer hardware, firmware, or software. In general, the systems may be implemented, in part, in a computer process product tangibly embodied in a machine-readable storage device for execution by a computer processor. In some embodiments, these systems preferably are implemented in a high level procedural or object oriented processing language; however, the algorithms may be implemented in assembly or machine language, if desired. In any case, the processing language may be a compiled or interpreted language. The methods described herein may be performed by a computer processor executing instructions organized, for example, into process modules to carry out these methods by operating on input data and generating output. Suitable processors include, for example, both general and special purpose microprocessors. Generally, a processor receives instructions and data from a read-only memory and/or a random access memory. Storage devices suitable for tangibly embodying computer process instructions include all forms of non-volatile memory, including, for example, semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially designed ASICs (application-specific integrated circuits).

What is claimed is:

1. A method, comprising a processor performing operations comprising:
   computing multiple n-order polynomial approximations to a value of a target pixel of an input image from multiple respective sets of m values of pixels in a neighborhood of the target pixel, wherein n>0 and m≧n+1;
   computing a respective approximation error from each of the computed n-order polynomial approximations; and
   computing a value of a pixel of an output image from the target pixel value and the computed approximation errors.

2. The method of claim 1, wherein the pixels in each of the sets of m values are collinear neighbors of the target pixel.

3. The method of claim 2, wherein the target pixel has coordinates (i,j) and the neighbors in each set have coordinates $\{i+l_u a, j+l_u b\}_u$, where u=1, . . . , m.

4. The method of claim 3, wherein $l_u$=u for u=1, . . . , m.

5. The method of claim 3, wherein $l_1$=1 and $l_u$=-(u-1) for u=2, . . . , m.

6. The method of claim 3, wherein $\{l_u\}_u = \{-\lfloor m/2 \rfloor, \ldots, -1, 1, \ldots, \lceil m/2 \rceil\}$.

7. The method of claim 3, wherein (a,b)∈{(0,1), (0,-1), (1,0), (-1,0)}.

8. The method of claim 3, wherein (a,b)∈{(0,1), (0,-1), (1,0), (-1,0), (-1,-1), (-1,1), (1,-1), (1,1)}.

9. The method of claim 1, wherein computing each n-order polynomial approximation comprises fitting an n-order polynomial to a respective one of the sets of m pixel values.

10. The method of claim 1, wherein computing each n-order polynomial approximation comprises computing a vector product $\vec{\beta}^T \cdot \vec{f}$, where $\vec{f} = \{f(i+l_u a, j+l_u b)\}_u$ and corresponds to one of the sets of m pixel values in the neighborhood of the target pixel on a line defined by a vector (a,b) with respect to target pixel coordinates (i,j), $\vec{\beta}^T$ is a vector with values equal to row (n-1) of $(L^T L)^{-1} L^T$, L is an m×(n+1) matrix with entries $L(u,v) = (l_u)^{n+1-v}$, u=1, . . . , m, v=1, . . . , n+1, and $L^T$ is a transpose of L.

11. The method of claim 10, wherein the values of $\vec{\beta}^T$ are obtained from a stored list of values computed before the method of claim 1 is applied to the input image.

12. The method of claim 1, wherein computing each approximation error comprises subtracting the target pixel value for a respective one of the n-order polynomial approximations.

13. The method of claim 1, wherein computing the output image pixel value comprises obtaining an influence function value for each of the computed approximation errors.

14. The method of claim 13, wherein computing the output image pixel value comprises computing an average of the influence function values.

15. The method of claim 14, wherein computing the output image pixel value comprises adding the target pixel value to the computed average.

16. The method of claim 1, wherein computing output image pixel values g(i,j) comprises computing:

$$g(i, j) = f(i, j) + \frac{1}{|N|+1}\sum_{(a,b)\in N}\psi\left[\left(\sum_{u=1}^{m}\beta_u f(i+l_u a, j+l_u b)\right) - f(i, j)\right]$$

where N is a neighborhood of (0,0), ψ is an influence function, f(i,j) is the target pixel value, $f(i+l_u a, j+l_u b)$ are values in the sets of m pixel values in the neighborhood of the target pixel on a line defined by a vector (a,b) with respect to target pixel coordinates (i,j), $\beta_u$, are values equal to entries of row (n+1) of $(L^T L)^{-1} L^T$, L is an m×(n+1) matrix with entries $L(u,v)=(l_u)^{n+1-v}$, u=1, ..., m, v=1, ..., n+1, and $L^T$ is a transpose of L.

17. The method of claim 16, wherein N excludes (0,0).

18. A method, comprising a processor performing operations comprising:
defining a neighborhood of a target pixel;
defining a polynomial of order n, wherein n>0;
defining an m-dimensional vector $\vec{l}$ with integer components $l_u$, wherein u=1, ..., m, and m≥n+1;
creating an m×(n+1) matrix L with entries $L(u,v)=(l_u)^{n+1-v}$, u=1, ..., m, v=1, ..., n+1;
computing an m-dimensional vector $\vec{\beta}^T$ with values $\beta_u$ equal to row (n+1) of $(L^T L)^{-1} L^T$, wherein $L^T$ is a transpose of L; and
determining a value of a pixel of an output image based on a value of the target pixel and the values $\beta_u$ of the vector $\vec{\beta}^T$.

19. The method of claim 18, wherein the determining comprises computing output image pixel values g(i,j) comprises computing:

$$g(i,j) = f(i,j) + \frac{1}{|N|+1} \sum_{(a,b)\in N} \psi\left[\left(\sum_{u=1}^{m} \beta_u f(i+l_u a, j+l_u b)\right) - f(i,j)\right]$$

N is a neighborhood of (0,0), $\psi$ is an influence function, f(i,j) are target pixel values of an input image, and $f(i+l_u a, j+l_u b)$ are values in the sets of m pixel values in the neighborhood of the target pixel on a line defined by a vector (a,b) with respect to target pixel coordinates (i,j).

20. The method of claim 19, wherein the computed components of $\vec{\beta}^T$ are stored in a list of values, and computing output image pixel values g(i,j) comprises retrieving the stored list of values.

21. A system, comprising:
a computer-readable medium storing computer-readable instructions, and
a computer processor coupled to the computer-readable medium, operable to execute the instructions, and based at least in part on the execution of the instructions operable to perform operations comprising
computing multiple n-order polynomial approximations to a value of a target pixel of an input image from multiple respective sets of m values of pixels in a neighborhood of the target pixel, wherein n>0 and m≥n+1 ;
computing a respective approximation error from each of the computed n-order polynomial approximations; and
computing a value of a pixel of an output image from the target pixel value and the computed approximation errors.

22. The system of claim 21, wherein the pixels in each of the sets of m values are collinear neighbors of the target pixel.

23. The system of claim 22, wherein the target pixel has coordinates (i,j) and the neighbors in each set have coordinates $\{(i+l_u a, j+l_u b)\}_u$, where u=1, ..., m.

24. The system of claim 23, wherein $l_u$=u for u=1, ..., m.

25. The system of claim 23, wherein $l_1$=1 and $l_u$=−(u−1) for u=2, ..., m.

26. The system of claim 23, wherein $\{l_u\}_u = \{-\lfloor m/2 \rfloor, ..., -1, 1, ..., \lceil m/2 \rceil\}$.

27. The system of claim 23, wherein (a,b)∈{(0,1), (0,−1), (1,0), (−1,0)}.

28. The system of claim 23, wherein (a,b)∈{(0,1), (0,−1), (1,0), (−1,0), (−1,−1), (−1,1), (1,−1), (1,1)}.

29. The system of claim 21, wherein the at least one processing module is operable to fit an n-order polynomial to a respective one of the sets of m pixel values.

30. The system of claim 21, wherein the at least one processing module is operable to compute a vector product $\vec{\beta}^T \cdot \vec{f}$, where $\vec{f} = \{f(i+l_u a, j+l_u b)\}_u$ and corresponds to one of the sets of m pixel values in the neighborhood of the target pixel on a line defined by a vector (a,b) with respect to target pixel coordinates (i,j), $\vec{\beta}^T$ is a vector with values equal to row (n+1) of $(L^T L)^{-1} L^T$, L is an m×(n+1) matrix with entries $L(u,v)=(l_u)^{n+1-v}$, u=1, ..., m, v=1, ..., n+1, and $L^T$ is a transpose of L.

31. The system of claim 30, wherein the values of $\vec{\beta}^T$ are obtained from a stored list of values computed before the input image is received.

32. The system of claim 21, wherein the at least one processing module is operable to subtract the target pixel value for a respective one of the n-order polynomial approximations.

33. The system of claim 21, wherein the at least one processing module is operable to obtain an influence function value for each of the computed approximation errors.

34. The system of claim 33, wherein the at least one processing module is operable to compute an average of the influence function values.

35. The system of claim 34, wherein the at least one processing module is operable to add the target pixel value to the computed average.

36. The system of claim 21, wherein the at least one processing module is operable to compute output image pixel values g(i,j) by computing:

$$g(i,j) = f(i,j) + \frac{1}{|N|+1} \sum_{(a,b)\in N} \psi\left[\left(\sum_{u=1}^{m} \beta_u f(i+l_u a, j+l_u b)\right) - f(i,j)\right]$$

where N is a neighborhood of (0,0), $\psi$ is an influence function, f(i,j) is the target pixel value, $f(i+l_u a, j+l_u b)$ are values in the sets of m pixel values in the neighborhood of the target pixel on a line defined by a vector (a,b) with respect to target pixel coordinates (i,j), $\beta_u$ are values equal to entries of row (n+1) of $(L^T L)^{-1} L^T$, L is an m×(n+1) matrix with entries $L(u,v)=(l_u)^{n+1-v}$, u=1, ..., m, v=1, ..., n+1, and $L^T$ is a transpose of L.

37. The system of claim 36, wherein N excludes (0,0).

38. A computer-readable medium storing machine-readable instructions for causing a computing device to perform operations comprising:
computing multiple n-order polynomial approximations to a value of a target pixel of an input image from multiple respective sets of m values of pixels in a neighborhood of the target pixel, wherein n>0 and m≥n+1;
computing a respective approximation error from each of the computed n-order polynomial approximations; and
computing a value of a pixel of an output image from the target pixel value and the computed approximation errors.

39. The computer-readable medium of claim 38, wherein the pixels in each of the sets of m values are collinear neighbors of the target pixel.

40. The computer-readable medium of claim 39, wherein the target pixel has coordinates (i,j) and the neighbors in each set have coordinates $\{(i+l_u a, j+l_u b)\}_u$, where u=1, ..., m.

41. The computer-readable medium of claim 40, wherein $l_u$=u for u=1, ..., m.

42. The computer-readable medium of claim 40, wherein $l_1$=1 and $l_u$=−(u−1) for u=2, ..., m.

43. The compute-readable medium of claim 40, wherein $\{l_u\} = \{-\lfloor m/2 \rfloor, \ldots, -1, 1, \ldots, \lceil m/2 \rceil\}$.

44. The computer-readable medium of claim 40, wherein (a,b)∈{(0, 1), (0,−1), (1,0), (−1,0)}.

45. The computer-readable medium of claim 40, wherein (a,b)∈{(0,1), (0,−1), (1,0), (−1,0), (−1,−1), (−1,1), (1,−1), (1,1)}.

46. The computer-readable medium of claim 38, wherein the medium stores machine-readable instructions for causing the machine to fit an n-order polynomial to a respective one of the sets of m pixel values.

47. The computer-readable medium of claim 38, wherein the medium stores machine-readable instructions for causing the machine to compute a vector product $\vec{\beta}^T \cdot \vec{f}$, where $\vec{f} = \{f(i+l_u a, j+l_u b)\}_u$ and corresponds to one of the sets of m pixel values in the neighborhood of the target pixel on a line defined by a vector (a,b) with respect to target pixel coordinates (i,j), $\vec{\beta}^T$ is a vector with values equal to row (n+1) of $(L^T L)^{-1} L^T$, L is an m×(n+1) matrix with entries $L(u,v) = (l_u)^{n+1-v}$, u=1, ..., m, v=1, ..., n+1, and $L^T$ is a transpose of L.

48. The computer-readable medium of claim 47, wherein the values of $\vec{\beta}^T$ are obtained from a stored list of values computed before the input image is received.

49. The computer-readable medium of claim 38, wherein the medium stores machine-readable instructions for causing the machine to subtract the target pixel value for a respective one of the n-order polynomial approximations.

50. The computer-readable medium of claim 38, wherein the medium stores machine-readable instructions for causing the machine to obtain an influence function value for each of the computed approximation errors.

51. The computer-readable medium of claim 50, wherein the medium stores machine-readable instructions for causing the machine to compute an average of the influence function values.

52. The computer-readable medium of claim 51, wherein the medium stores machine-readable instructions for causing the machine to add the target pixel value to the computed average.

53. The computer-readable medium of claim 38, wherein the medium stores machine-readable instructions for causing the machine to compute output image pixel values g(i,j) by computing:

$$g(i,j) = f(i,j) + \frac{1}{|N|+1} \sum_{(a,b) \in N} \psi\left[\left(\sum_{u=1}^{m} \beta_u f(i+l_u a, j+l_u b)\right) - f(i,j)\right]$$

where N is a neighborhood of (0,0), ψ is an influence function, f(i,j) is the target pixel value, $f(i+l_u a, j+l_u b)$ are values in the sets of m pixel values in the neighborhood of the target pixel on a line defined by a vector (a,b) with respect to target pixel coordinates (i,j), $\beta_u$ are values equal to entries of row (n+1) of $(L^T L)^{-1} L^T$, L is an m×(n+1) matrix with entries $L(u,v) = (l_u)^{n+1-v}$, u=1, ..., m, v=1, ..., n+1, and $L^T$ is a transpose of L.

54. The computer-readable medium of claim 53, wherein N excludes (0,0).

\* \* \* \* \*

UNITED STATES PATENT AND TRADEMARK OFFICE
CERTIFICATE OF CORRECTION

PATENT NO. : 7,720,303 B2  Page 1 of 1
APPLICATION NO. : 10/833435
DATED : May 18, 2010
INVENTOR(S) : Renato Keshet It is certified that error appears in the above-identified patent and that said Letters Patent is hereby corrected as shown below:

In column 8, line 37, in Claim 10, delete "(n-1)" and insert -- (n+1) --, therefor.

In column 9, line 2, in Claim 16, delete "$\beta_u$," and insert -- $\beta_u$ --, therefor.

In column 9, line 44, in Claim 21, delete "instructions," and insert -- instructions; --, therefor.

In column 9, line 53, in Claim 21, delete "$m \geq n+1$ ;" and insert -- $m \geq n+1$; --, therefor.

In column 10, line 9, in Claim 29, delete "in" and insert -- m --, therefor.

Signed and Sealed this

Twenty-third Day of November, 2010

David J. Kappos
*Director of the United States Patent and Trademark Office*